United States Patent
Murgia et al.

(10) Patent No.: US 10,122,627 B2
(45) Date of Patent: Nov. 6, 2018

(54) NETWORK ROUTING THROUGH AN OVERLAY NETWORK

(71) Applicant: Citrix Systems, Inc., Fort Lauderdale, FL (US)

(72) Inventors: Marco Murgia, Los Gatos, CA (US); Praveen R. Dhanabalan, Bangalore (INX)

(73) Assignee: Citrix Systems, Inc., Fort Lauderdale, FL (US)

(*) Notice: Subject to any disclaimer, the term of this patent is extended or adjusted under 35 U.S.C. 154(b) by 199 days.

(21) Appl. No.: 15/252,821

(22) Filed: Aug. 31, 2016

(65) Prior Publication Data

US 2018/0062986 A1   Mar. 1, 2018

(51) Int. Cl.
| | |
|---|---|
| H04L 12/26 | (2006.01) |
| H04L 12/715 | (2013.01) |
| H04L 12/721 | (2013.01) |
| H04L 29/08 | (2006.01) |
| H04L 12/801 | (2013.01) |

(52) U.S. Cl.
CPC ............ *H04L 45/64* (2013.01); *H04L 43/08* (2013.01); *H04L 45/124* (2013.01); *H04L 67/1061* (2013.01); *H04L 47/12* (2013.01)

(58) Field of Classification Search
CPC ....... H04L 45/64; H04L 43/08; H04L 45/124; H04L 67/1061
See application file for complete search history.

(56) References Cited

U.S. PATENT DOCUMENTS

| | | | | |
|---|---|---|---|---|
| 6,801,502 B1* | 10/2004 | Rexford | ............... | H04L 45/00 370/235 |
| 7,586,899 B1* | 9/2009 | Mohaban | .......... | H04L 29/06027 370/352 |
| 2003/0088696 A1* | 5/2003 | McCanne | .......... | H04L 12/1836 709/238 |

* cited by examiner

*Primary Examiner* — Kevin C. Harper
(74) *Attorney, Agent, or Firm* — Fox Rothschild LLP; Robert J. Sacco; Carol E. Thorstad-Forsyth

(57) ABSTRACT

Computer networking device obtains route information including route attributes specifying characteristics for each of a plurality of routes through a first network. A routing algorithm is applied to choose an optimal route to one of a plurality of peer computer networking devices comprising a second network which is an overlay upon the first network. The optimal route is chosen based on the type of data contained in the data packet and the plurality of route attributes associated with the routes. The routes traverse paths through the first computer network which include network nodes other than the peer networking devices.

22 Claims, 5 Drawing Sheets

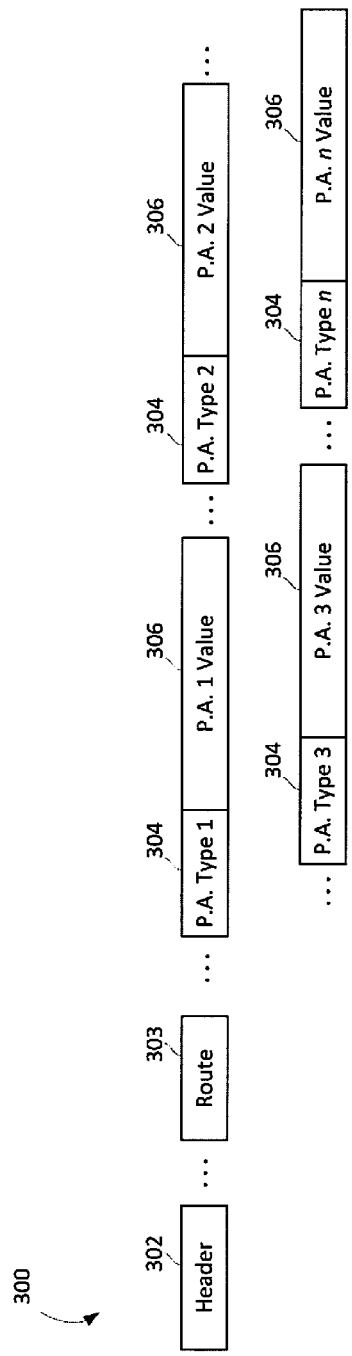

NETWORK ROUTING THROUGH AN OVERLAY NETWORK

BACKGROUND

Statement of the Technical Field

The inventive arrangements relate to computer networks, and more particularly to methods and systems for routing information over a computer network.

Description of the Related Art

The related art concerns methods and systems for routing data through computer networks. In a packet network data is communicated from a source computer to a destination computer by means of data packets, which are sometimes called datagrams. A typical data network can comprise numerous routers which are used to facilitate a flow of data between a source and destination node. The routers have ports for receiving incoming data packets and transmitting outgoing data packets. The packets are received from a source node or another router and are then transmitted to another router or to a destination node.

There are three basic aspects of network routing, which include: (1) routing protocols, (2) routing algorithms and (3) routing databases. Routing protocols are semantics and other procedures that allow information to be gathered and distributed among routers. Routing algorithms are processes or methods that use the information which has been gathered to determine paths to destination nodes. The routing databases comprise path information which has been stored based on the results of processing performed by routing algorithms and may include routing table entries.

A routing protocol will define the manner in which information concerning routes is shared or communicated between network nodes (routers). A conventional router operating in accordance with a routing protocol will transmit route advertisements to other routers. The route advertisements will indicate that a particular network is available or reachable. The route advertisement will include information concerning the IP address of the next "hop" which is to be used to get to the final destination. Methods used by routing protocols to advertise available routes will comprise either a link-state or vector-distance type of routing protocol. The link-state protocols broadcast information concerning the link state of neighbor nodes (i.e., whether a link is available). The vector-distance type routing protocols involve broadcast of an entire routing table possessed by a particular router node.

A routing domain can be understood to include a particular group of routers that operate under common administrative control. As such, these routers will generally all utilize a shared or common routing protocol. An Interior Gateway Protocol (IGP) such as RIP, OSPF, and ISIS is a routing protocol that is directed to intra-domain routing. In contrast, Exterior Gateway Protocols (EGP) concern inter-domain routing, between enterprises under disparate administrative control. Border Gateway Protocol (BGP) is a well-known standard inter-domain protocol and is the routing protocol used to route traffic across the Internet. BGP is primarily a vector-distance type routing protocol.

Routing databases can comprise routing tables containing routing entries which relate to different routes data packets can travel to reach a destination node. Each entry will comprise a destination IP address and the IP address of the device comprising the next hop in order to reach that destination. Routing tables are often static as they are based primarily on network configuration and topology.

For a particular incoming data packet, a routing table may specify either a direct route or an indirect route to a destination node. The direct route will specify a destination host as the next destination for the particular packet. However, there are many instances in which the router which receives a packet will not have available to it a direct communication path to a destination node. In those instances the routing table will specify an indirect route for the data packet to reach a particular destination, which is usually through another router. As will be appreciated, a data packet may be communicated through multiple routers as it travels along a path from a source node to a destination node. Each time the data packet communicates from one such device to the next device, it is referred to as a "hop".

When searching the routing table to determine a particular route that a packet will be assigned, the router uses the destination IP address of each packet as a search key. The search key is used to locate an appropriate IP address of the next hop device that the data packet should be directed to in order to reach its destination host. The routing tables can include information concerning both primary and alternate routes through which data can be communicated so as to arrive at its intended destination. The alternate routes are used when traffic congestion or equipment failures prevents the packet data from being communicated along the preferred primary route.

SUMMARY

Embodiments concern a method and system for routing packet data through an overlay network based on application needs and network conditions. A computer networking device connected to a computer network determines a plurality of routes to a plurality of peer computer networking devices. The computer networking device obtains route information for each of the plurality of routes, including a plurality of route attributes specifying dynamic characteristics for each of the plurality of routes. Exemplary route attributes can include available bandwidth associated with the particular route, data latency associated with the particular route, data loss characteristics associated with the particular route and jitter corresponding to the route. The networking device stores the route information for each of the routes, including the plurality of route attributes. The networking device receives one or more data packet to be communicated through the device and inspecting each packet to determine a type of data contained therein. It then uses a routing algorithm to choose an optimal route to one of the peer computer networking devices. The optimal route is chosen from among the plurality of routes based on the type of data contained in the data packet and the plurality of route attributes associated with each of said plurality of routes. In the foregoing embodiment, the computer networking device and the peer computer networking devices comprise a second computer network which is an overlay upon on the first computer network. Further, plurality of routes traverse paths through the first computer network which include network nodes other than said peer networking devices.

The routing algorithm selectively varies levels of significance or weight accorded to each of the plurality of route attributes within the routing algorithm based on the type of data contained in the data packet. The type of data packet can imply a type of application which communicated said data packet, and the routing algorithm can therefore select the optimal route to facilitate optimal performance of the type of application which is implied. More particularly, optimal performance can be obtained by more heavily weighting within the routing algorithm the importance of one or more attributes from among the plurality of attributes for purposes of selecting the optimal route from among the plurality of routes.

With the arrangements as described herein, an optimal route which is chosen for a subsequently received second data packet can be different, even though such packet may be of the same type as the previous data packet. The optimal route is varied when a change occurs in one or more of the plurality of routes with respect to one or more of the route attributes which are predetermined to be of importance for communicating the particular type of data.

The network computing device can receive from one or more of the peer computer networking devices one or more route update messages specifying the one or more network routes and plurality of route attributes. Similarly, the network computing device can communicate to the plurality of peer computer networking devices one or more network routes which have been identified by the computer networking device. Such communication can include route attributes associated with one or more network routes. Since these route attributes are dynamically variable, the computer network device can communicates updates to the peer computer network devices when a change exceeds a predetermined threshold. The updated information can be determined by the computer networking device based on data traffic communicated between the computer networking device and one or more of the peer computer network devices.

BRIEF DESCRIPTION OF THE DRAWINGS

Embodiments will be described with reference to the following drawing figures, in which like numerals represent like items throughout the figures, and in which:

FIG. 3 is a schematic representation of a routing update message which can be used to communicate updated routing information.

FIG. 4 is a drawing which is useful for understanding how a plurality of path attribute values corresponding to a plurality of routes can be stored in a routing table.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Embodiments disclosed herein may provide certain advantages in a communication network, such as a packet switching network. An embodiment improves the performance of such networks by finding the best path across a plurality of middlebox nodes which form an overlay network on an existing network. The term "middlebox" as used herein can be understood as referring to computer networking devices which manipulate data traffic in ways that are normally associated with a router. These routing functions are performed for the purpose of facilitating certain enhanced network routing protocols as described herein. According to one aspect, conventional routing protocol semantics are modified to facilitate advertising of network path attributes (such as bandwidth, latency, loss and jitter). The modified protocol results in each middlebox node having enhanced knowledge of certain details pertaining to link conditions as between its adjacent nodes (such as bandwidth, latency, loss and jitter). Thereafter, each middlebox node can receive packets and perform routing functions. The routing functions can involve dynamically mapping application needs against available link paths (based on the available enhanced path information) so as to choose an optimal routing path that dynamically meets the needs of each data packet.

Figure 1:
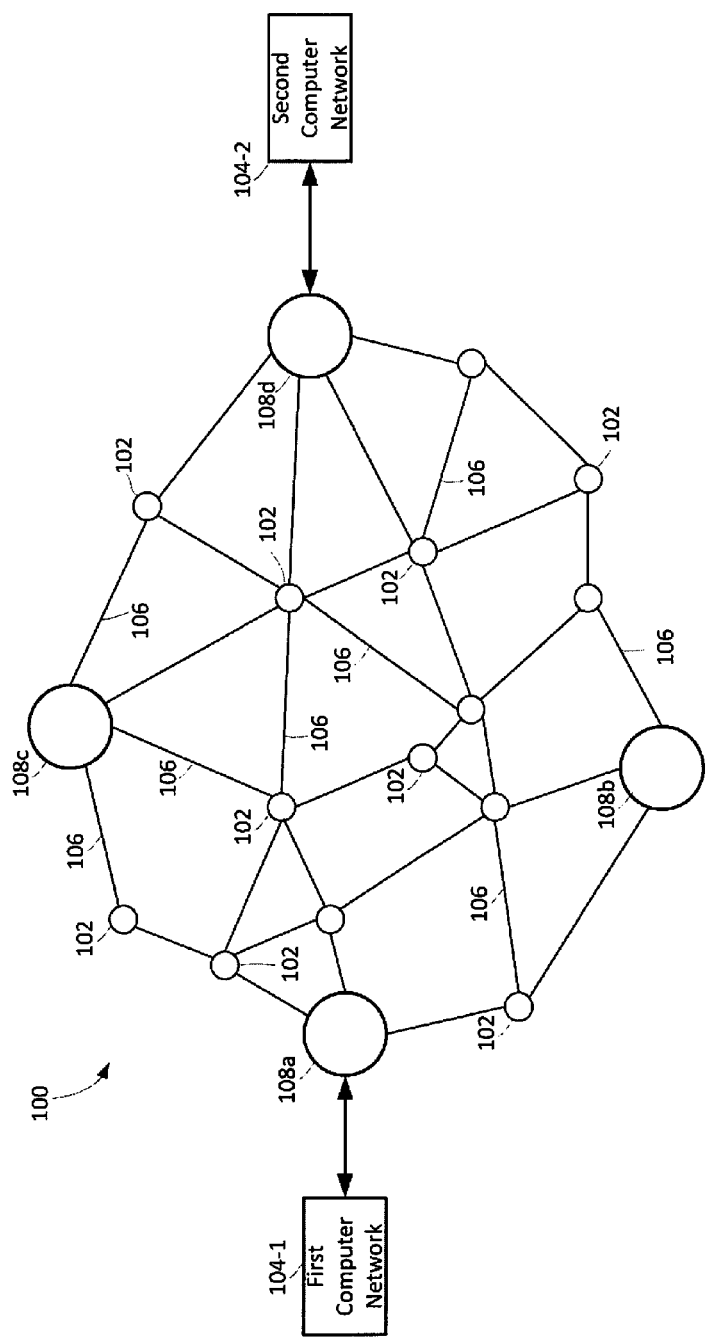
FIG. 1 is an exemplary diagram of a computer data communication network showing certain nodes comprising an overlay network.

Referring now to FIG. 1 it can be observed that a packet data network 100 can comprise a plurality of network nodes 102 which are capable of receiving and routing data packets. As such, the network nodes 102 can be generally understood to include conventional network routers capable of routing data packet traffic through the data network. The data packets are routed through various communication paths 106 defined between adjacent nodes 102 from a first computer network 104-1 to a second computer network 104-2. Within such a network there is advantageously provided an overlay network which is comprised of a plurality of middleboxes 108a, 108b, 108c and 108d. These middleboxes 108a, 108b, 108c and 108d can perform a variety of functions, including manipulation of network traffic for routing purposes as described herein. For example, the middleboxes 108a, 108b, 108c, 108d can perform routing functions similar to the routing functions performed at one or more network nodes 102, but can offer advanced routing features for certain data traffic communications between first computer network 104-1 and second computer network 104-2. These advanced routing functions will become more apparent as the discussion progresses.

Figure 2:
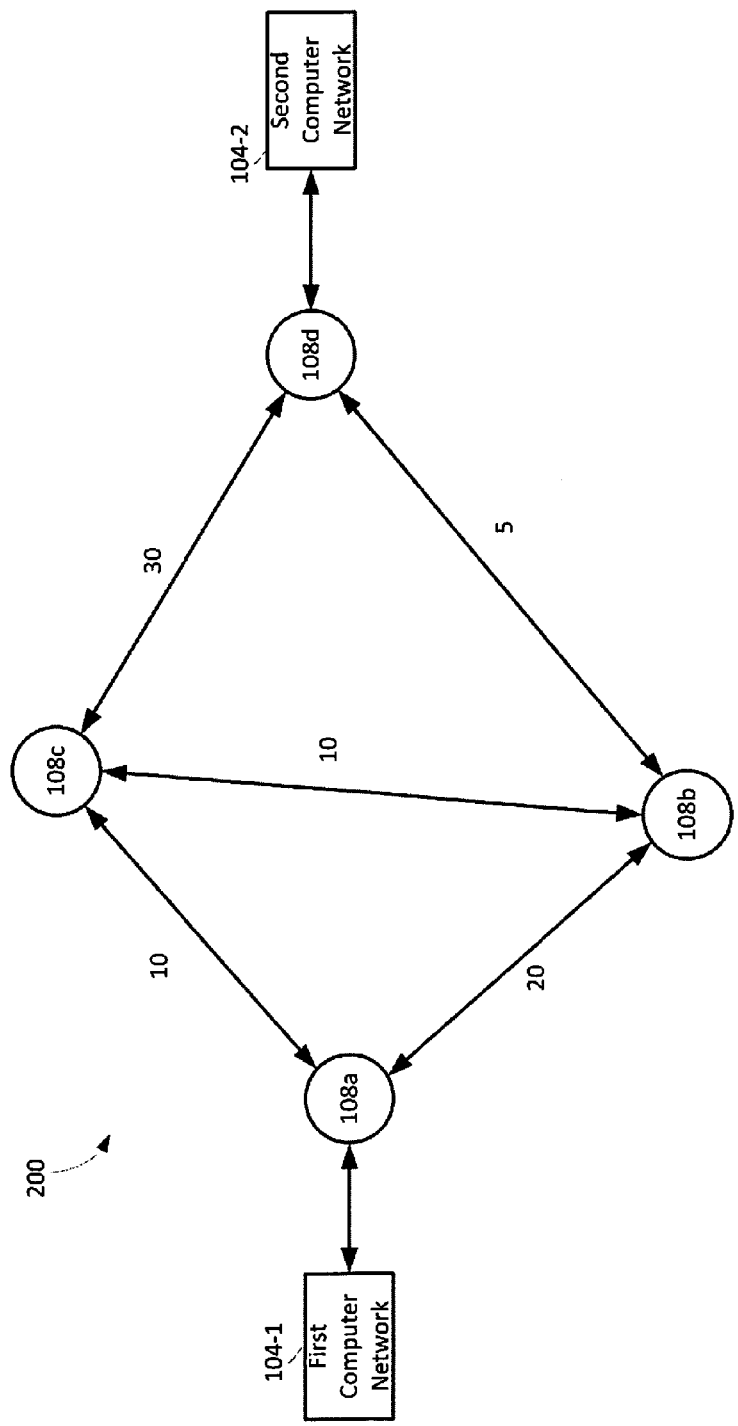
FIG. 2 exclusively shows those nodes which comprise the overlay network in FIG. 1.

An exemplary overlay network 200 is shown in FIG. 2. The overlay network 200 shown is based on the exemplary network 100 in FIG. 1 but is shown without the plurality of network nodes 102. This is a drawing simplification to facilitate greater clarity and understanding of an embodiment. However, it should be understood that the communications among the middleboxes 108a, 108b, 108c and 108d as described herein will generally include communication paths that may transition through one or more of such network nodes 102 as shown in FIG. 1.

As the overlay network of middleboxes grows, it becomes possible to establish routing protocols that allow such middleboxes to find the best path through the network 100 for meeting the requirements of a particular software application executing on machines associated with computer network 104-1 and 104-2. While only four middleboxes 108a, 108b, 108c and 108d are shown in this exemplary overlay network, it should be appreciated that an actual network could have hundreds or thousands of such middleboxes distributed throughout a large scale network such as the Internet. The selection of the best path can be based on a plurality of path metrics as between adjacent middleboxes. These metrics are advantageously selected so that they are useful for assessing the suitability of different paths for such communicating data. Exemplary path metrics that can be evaluated for this purpose can include information concerning available bandwidth, latency, loss and jitter associated with a particular path (which may traverse many of the nodes 102).

A routing protocol utilized by a router can define the manner in which information concerning routes is communicated between network nodes. A conventional router operating in accordance with a routing protocol will transmit route advertisements to other routers. Methods used by routing protocols to advertise available routes will generally comprise either a link-state or distance-vector type of routing protocol. Link-state routing protocols will create a topology of the network to which they are connected. The link-state protocols broadcast information concerning the link state of neighbor nodes (i.e., whether a link is available). They create a routing table populated with link-state advertisements from neighboring routers. The link-state advertisements contain information such as the cost of each route and the IP address of the neighboring router which generated the link state advertisement. In contrast, the distance-vector type routing protocols determine the communication path to a remote network using hop count as the metric. The hop count will indicate the number of routers that a packet must pass through in order to reach a destination node. Distance-vector involve broadcast of information concerning an entire routing table possessed by a particular router node.

Border Gateway Protocol or BGP is the most commonly used protocol between gateway hosts on the internet. Each gateway host will typically have its own router which has access to a routing table. The routing table will comprise a plurality of entries specifying known routers, the addresses that such routers can reach, and a cost metric associated with the path to each router (e.g. the number of hops) to facilitate optimal selection of routes. Systems using BGP periodically communicate or advertise updated router information when a host has detected a change in the network. Such communications are performed using Transmission Control Protocol (TCP). BGP also allows administrators to manually configure or specify certain internal cost metrics associated with various routing paths in accordance with policy statements.

From the foregoing it may be appreciated that conventional network routing over the Internet (e.g. using a routing protocol such as BGP) can share certain path attributes with other routers in the form of routing updates or advertisement messages. But these systems mainly result in static routing tables based on distance-vectors (how many hops a packet would have to travel to reach a destination) and/or local preferences which are manually entered by administrators and define internal cost metrics associated with a particular destination. This type of static cost weighting does not always guarantee network quality through the network, and will result in sub-optimum network paths for various types of data traffic between software applications at the source and destination nodes.

Accordingly, in an embodiment disclosed herein, the middleboxes 108a, 108b, 108c, 108d in FIGS. 1 and 2 will function as routers in an overlay network. These middleboxes can use a routing protocol (e.g. a protocol similar to BGP) and can similarly communicate updated router information to one another. But the middleboxes 108a, 108b, 108c, 108d will operate in accordance with modified routing protocol semantics so as to include additional information or attributes in routing table updates or route advertisement messages. The additional information can comprise one or more attributes associated with different available routes which are advertised as between middleboxes 108a, 108b, 108c, 108d. The additional attributes will comprise link metrics which describe characteristics of paths between middleboxes in the overlay network, and which are useful for evaluating the applicability of such paths based on the type of data packet to be routed. Examples of such link metrics or attributes to be included can comprise one or more of the following: available bandwidth, latency, loss and jitter associated with each route or path between middlebox nodes. Of course, the embodiments are not limited in this regard and other types of path attributes can also be communicated. Each middlebox 108a, 108b, 108c, 108d can use the additional path attribute information to advantageously choose an optimum path for each data packet routed between middleboxes. Further, the optimum path can be selected in accordance with the needs of a particular application which generated such data packets.

Referring once again to FIG. 2, each middlebox node 108a, 108b, 108c, 108d can receive updated router information or route advertisement messages from other middlebox nodes 108a, 108b, 108c, 108d in the network 200. The information contained in these messages is then stored and/or updated in a database or table within each middlebox node. As an example, consider a scenario where a metric specifying a path attribute between two middleboxes is included as part of the updated router information. Middlebox 108c may advertise or communicate to middlebox 108a a route to middlebox 108d where the particular metric (e.g. latency) has a value 30; and a route to middlebox 108b where the same metric has a value 10. Middlebox 108b may advertise or communicate a route to middlebox 108d where the metric has a value 5, and a path to middlebox 108c where the metric has a value 10. A middlebox 108a will further be aware that the metric for the path to middlebox 108c has value 10, and the metric for the path to middlebox 108b has a value 20. So the middlebox node 108a will be aware of the available routing paths, and will also have information concerning current path attributes specified by the particular metric. One or more of these attributes can then be evaluated when considering whether a path is suitable for a particular type of packet.

Each middlebox can be responsible for evaluating the quality of paths to adjacent middlebox nodes in the overlay network. For example, middlebox node 108c can be responsible to determine dynamic link attributes (bandwidth, latency, packet loss and jitter) as between itself and each of nodes 108a, 108b, and 108d. Similarly, middlebox node 108a would be responsible for determining the dynamic link attributes between itself and each of nodes 108b and 108c. Each middlebox could then share this information with other nodes in the network in routing update messages. The information can be gathered by each node using any suitable technique. In one embodiment, a middlebox can encapsulate actual data traffic using a packet header for this purpose. In other embodiments the middlebox can generate synthetic or test data for purposes of determining dynamic link attributes of a particular routing path. This information can be shared or communicated with other nodes in the network and updated information can be communicated to other nodes as necessary.

Various techniques can be applied to gather the information pertaining to path quality. Bandwidth is the bit rate achieved by each of the ports in the appliance. It is either the capacity of the port or the network threshold that is dictated by the Network provider (ISP). Latency can be measured from the data packets. For encapsulated packets, the packets could be time-stamped and hence from the sending time and the receiving timestamp on the encapsulated packet the latency (one-way latency) can be computed. Packet jitter concerns the transmission time variations between the various packets received on the same connection. If the variation is high then the packet jitter is high (indicating a poor connection). This jitter information can be computed from the various connections through the appliance. Packet loss information pertains to the average packet loss that happened between two nodes within a period of time. Thus, packet loss can be determined by the failure to receive a proper acknowledgement (ACK) message at the sending node for one or more transmitted packets. When the ACK message is not received at the sending node, then the packet is assumed lost. The appliance can keep track of this information and determine over time how much loss is experienced when using a particular path through the network. A further possibility for measuring packet loss could involve the addition of a sequence number to a data packet. For example, this could be accomplished by means of a packet encapsulation process wherein the sequence number is included in the encapsulation. The addition of the sequence number would facilitate a faster detection mechanism for determining rate of packet loss as compared to relying upon receipt of an ACK message. In an embodiment, an encapsulation process could advantageously include both a sequence number and the timestamp information noted above so that a receiving device can accurately calculate latency, loss and jitter.

Continuing the foregoing example in FIG. 2, assume that the metric indicates latency of each path, wherein an increasing magnitude of the metric value indicates increasing data latency. Assume that node 108a receives data packets from first computer network 104-1, and that the address information on the data packets indicates that they are to be communicated to a computer device (not shown) in second compute network 104-2. In such a scenario, there are 4 possible routes through which the data packets can travel: (1) 108a-108c-108d, (2) 108a-108b-108d, (3) 108a-108b-108c-108d, and (4) 108a-108c-108b-108d. A conventional routing algorithm could be expected to choose paths (1) or (2) as the two possible paths based on number of hops (hops in this example are all of equal weight). However, if data latency is the primary metric of concern with regard to the application from which the data packets originated, then the optimal path would be (2) or (4) since they offer minimum overall latency. A simple calculation shows path (1) 108a-108c-108d to have a combined latency metric of 40 (10+30), path (2) 108a-108b-108d to have a combined latency metric 25 (20+5) and path (3) 108a-108c-108b-108d to be of weight 25 (10+10+5). So paths (2) and (3) would be the preferred routes since they offer the lowest overall latency.

For simplicity of understanding, the foregoing example was limited to a single type of metric (latency) for describing a path attribute. However, it is advantageous for each middlebox node 108a, 108b, 108c, 108d to specify multiple path metrics in updated route information communicated herein. Consequently, a particular middlebox 108a, 108b, 108c, 108d receiving data packets could evaluate one or more different path attributes metrics for routing purposes. The particular path attributes selected for consideration in each case can be selected in accordance with a routing algorithm for the particular application which originated the data packets. Consequently, an optimal path can be chosen by the routing algorithm in each case for data packets associated with different applications.

For example, a route algorithm evaluating how best to route packets associated with Voice Over Internet Protocol (VOIP) communications might primarily consider a metric specifying total jitter over a particular route. In contrast, if the route algorithm is routing packets associated with a virtual desktop application then it might instead use total latency as a primary consideration when selecting an optimal route. So the route selection through the network 100 can be customized to the type of application which generated the data packet.

Referring now to FIG. 3 there is illustrated an exemplary update message that can be communicated between middleboxes 108a, 108b, 108c, 108d. The exact format of the message is not critical provided that it is sufficient to clearly communicate the desired information between middleboxes. Accordingly, route advertisement or route update message formats of one or more existing routing protocols can be modified to include the attribute information as indicated. Likewise any suitable communication protocol can be used to communicate such route advertisement or route update messages. An exemplary communication protocol used for this purpose is TCP. The route update message 300 can include a header 302 which can indicate message length and message type. The message type can indicate that the message is an update message used to transfer routing information between middlebox peers 108a, 108b, 108c, 108d. The update message 300 is used to advertise feasible routes among the middleboxes and can specify at least one route 303 for communicating data to a destination node. Only a single route 303 is shown in FIG. 3 but it will be appreciated that such a routing update message may specify a plurality of such routes. The route 303 is accompanied by attribute information relating to the route. This attribute information includes at least information specifying a path attribute type 304 and a corresponding path attribute value 306. As shown in FIG. 3, a plurality of path attribute types 1 . . . n can be specified for each route within the route update message. Exemplary attributed types can include available bandwidth associate with the identified route, data latency associated with the identified route, data loss characteristics associated with the identified route and jitter corresponding to the identified route. It will be appreciated that each of these path attributes will be a composite value that is associated with a particular route 303 which may comprise a path through the network 100 involving numerous routers or nodes 102 and or autonomous network domains. The route information shared among middleboxes can then be assembled by each middlebox into routing tables as shown in FIG. 4 wherein various sets of attributes 1 . . . n are listed for routes A, B, C . . . r.

Figure 5:
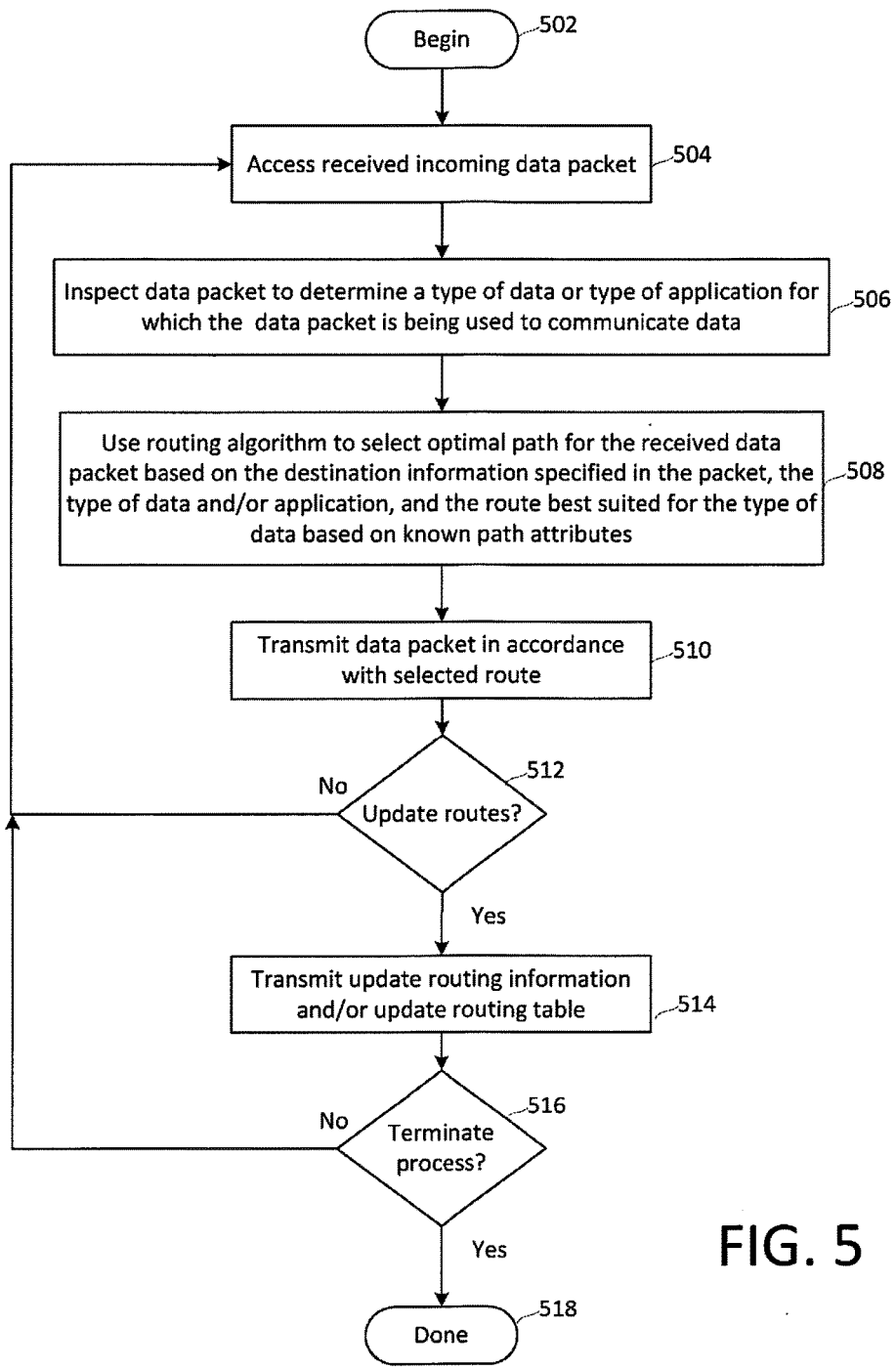
FIG. 5 is a flowchart that is useful for understanding how the information in the routing table of FIG. 4 can be used for routing various types of data.

Referring now to FIG. 5, there is shown a flowchart which is useful for understanding the manner in which the shared attribute information can be used to select optimal routes for data packets received at each middlebox node in the overlay network 200. The process begins in step 502 and continues to 504 where a middlebox accesses from a buffer or memory location a received incoming data packet. The packet is examined or inspected in 506 to determine the type of application which originated the packet and/or the type of data (e.g. video data, VOIP data, FTP data, or data supporting a virtual desktop session) which is being communicated. Methods for deep packet inspection (DPI) are known in the art and therefore will not be described here in detail. However, it may be appreciated that such methods will typically involve inspection of layer 2 and beyond layer 3 of the standard OSI model. In some cases, DPI methods invoked in accordance with one or more embodiments herein can look through layers 2-7 of the OSI model. This inspection can include headers and data protocol structures as well as the payload of the message. The DPI will thereafter identify and classify data traffic based on a database of packet signatures which associate certain data characteristics with defined data types and/or software applications which use such data types. For example, the data packets may be determined to comprise video data, VOIP data, FTP data, or data supporting a virtual desktop session.

The optimal data transmission requirements can vary depending on the particular data type. Accordingly, the type of data that is being communicated as determined in step 506 can be used in step 508 for selecting a particular route through which such data will be communicated. Accordingly, after the data type and/or software application type has been identified, the process then continues to step 508 where a routing algorithm uses several factors to select an optimal routing path between middlebox nodes comprising the overlay network. Factors which may be considered for this purpose can include vector distance (as per conventional routing methods), but will also involve other considerations which are useful for selecting an optimal path based on the type of data being communicated. For example, the routing algorithm can consider when selecting a routing path: the available bandwidth associate with the particular route, data latency associated with the particular route, data loss characteristics associated with the particular route and jitter corresponding to the route. In such a routing algorithm, different attributes can be accorded different weights in accordance with the type of data which is being communicated. Consequently, the routing algorithm can select a routed for an incoming data packet which is optimal for that data packet type. The exact nature of the algorithm can vary, but it should be arranged to utilize the additional available path attribute information to choose an optimal path for each data type.

Once the particular route has been selected, the process continues on to step 510 wherein the data packet is transmitted to the next hop along a chosen route. At 512 a decision can be made as to whether a routing update action is needed. If no routing update action is required (512: No), the process returns to 504 to process the next data packet for routing purposes. However, if a routing update is required (512: Yes), then the process continues on to 514 wherein the middlebox can communicate updated routing information to its peer nodes and/or update its own routing table with route information it has received from other nodes. Routing updates actions can be performed on a periodic basis and/or when a change is detected in existing routes. For example a change can involve a route which is no longer available. Alternatively, the change can be a detected change in one of the route attributes (e.g. available bandwidth, latency, packet loss and jitter.

A decision can be made in step 516 as to whether the process has been terminated. If so (516: Yes), then the process terminates at 518; otherwise (516: No) the process returns to 504 and begins processing the next incoming data packet.

In FIG. 5 levels of significance or weight accorded to each of the plurality of route attributes within the routing algorithm are advantageously based on the type of data contained in the data packet. As will be appreciated, the type of data packet implies a type of software application which communicated said data packet, and the routing algorithm selects in step 508 the optimal route to facilitate optimal performance of the type of application which is implied. So the amount of weigh or significance accorded by the algorithm to each of the route attributes when selecting a route can be selectively varied based on the data type and/or application type. Optimal performance for a particular application using the communication service is obtained by more heavily weighting within the routing algorithm the importance or significance of one or more attributes from among the plurality of attributes. The more heavily weighted attributes are those which are predetermined to be of special important for that application type or data type for purposes of selecting the optimal route from among the plurality of routes.

With the foregoing arrangement, an optimal route which is chosen can vary or change at step 508 for a subsequently received data packet which is of the same type as an earlier data packet which has been communicated. For example, the optimal route selection can change when a change occurs in one or more of the plurality of routes with respect to one or more of the route attributes which are predetermined to be of importance for communicating the type of data under consideration.

The middleboxes described herein can comprise a computer networking device (e.g. a network appliance) comprised of one or more components such as a processor, an application specific circuit, a programmable logic device, a digital signal processor, or other circuit programmed to perform the functions described herein. Embodiments can be realized in one computer system or several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

Embodiments of the inventive arrangements disclosed herein can be realized in one computer system. Alternative embodiments can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein. A computer system as referenced herein can comprise various types of computing systems and devices, including a server computer, a personal computer (PC), a laptop computer, a desktop computer, a network router, switch or bridge, or any other device capable of executing a set of instructions (sequential or otherwise) that specifies actions to be taken by that device.

Figure 6:
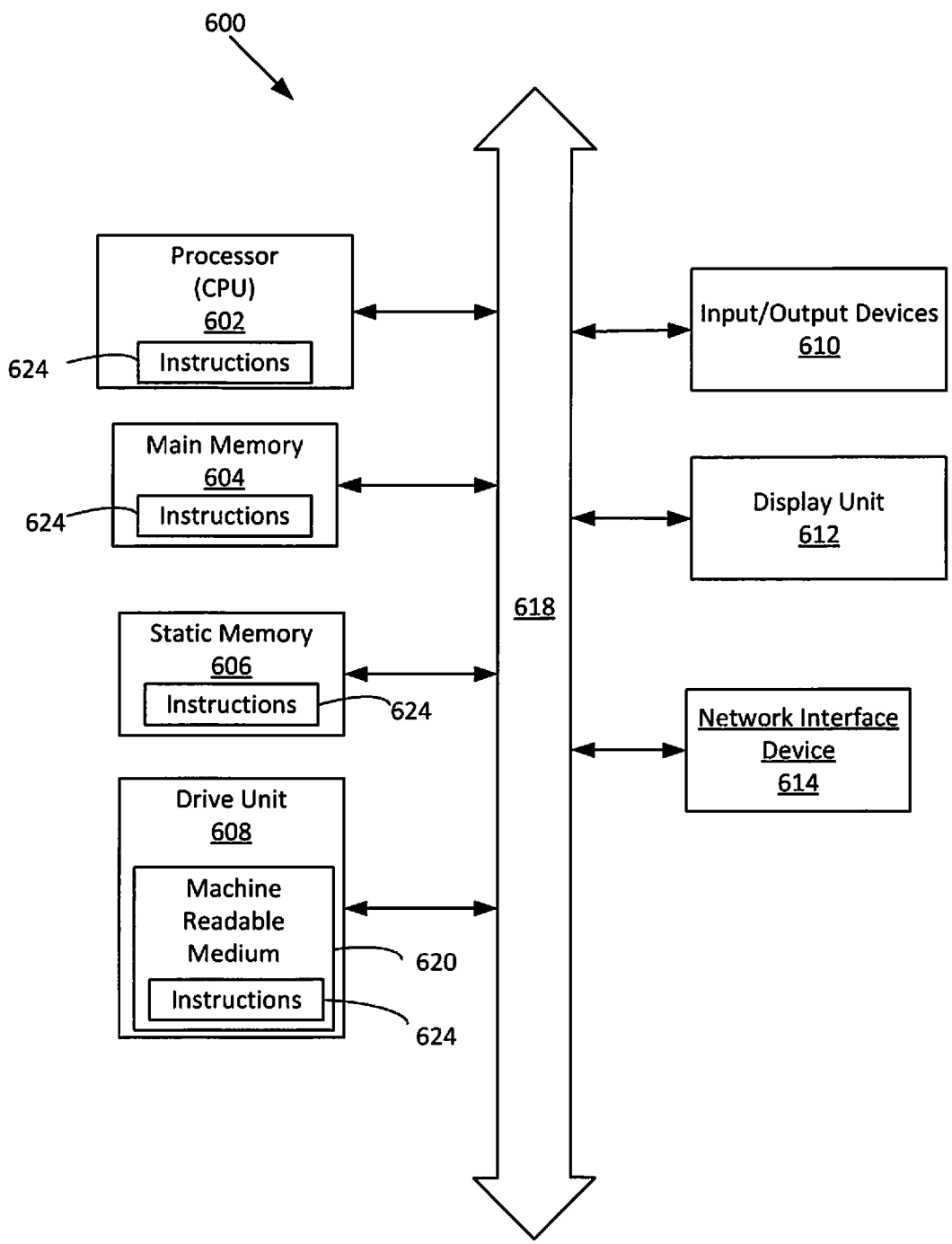
FIG. 6 is a block diagram of an exemplary computer system that can perform processing operations as described herein for purposes of implementing an overlay network.

Referring now to FIG. 6, there is shown a hardware block diagram comprising an exemplary computer system 600. The machine can include a set of instructions which are used to cause the computer system to perform any one or more of the methodologies discussed herein. In a networked deployment, the machine can function as a server or a router. In one or more embodiments, the exemplary computer system 600 can correspond to each of the middleboxes 108*a*, 108*b*, 108*c*, 108*d*. In some embodiments, the computer 600 can operate independently as a standalone device. However, embodiments are not limited in this regard and in other scenarios the computer system can be operatively connected (networked) to other machines in a distributed environment to facilitate certain operations described herein. Accordingly, while only a single machine is illustrated it should be understood that embodiments can be taken to involve any collection of machines that individually or jointly execute one or more sets of instructions as described herein.

The computer system 600 is comprised of a processor 602 (e.g. a central processing unit or CPU), a main memory 604, a static memory 606, a drive unit 608 for mass data storage and comprised of machine readable media 620, input/output devices 610, a display unit 612 (e.g. a liquid crystal display (LCD), a solid state display, or a cathode ray tube (CRT)), and a network interface device 614. Communications among these various components can be facilitated by means of a data bus 618. One or more sets of instructions 624 can be stored completely or partially in one or more of the main memory 604, static memory 606, and drive unit 608. The instructions can also reside within the processor 602 during execution thereof by the computer system. The input/output devices 610 can include a keyboard, a mouse, a multi-touch surface (e.g. a touchscreen) and so on. The network interface device 614 can be comprised of hardware components and software or firmware to facilitate wired or wireless network data communications in accordance with a network communication protocol utilized by a data network 100, 200.

The drive unit 608 can comprise a machine readable medium 620 on which is stored one or more sets of instructions 624 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 600 should be understood to be one possible example of a computer system which can be used in connection with the various embodiments. However, the embodiments are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout the specification may, but do not necessarily, refer to the same embodiment.

Furthermore, the described features, advantages and characteristics disclosed herein may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

We claim:

1. A method for routing packet data through an overlay network based on application needs and network conditions, comprising:
   in a computer networking device connected to a first computer network, determining a plurality of routes to a plurality of peer computer networking devices;
   obtaining at the computer networking device route information for each of the plurality of routes, said route information comprising a plurality of route attributes specifying dynamic characteristics for each of the plurality of routes;

storing at the computer networking device the route information for each of the plurality of routes, including the plurality of route attributes;

receiving at least one data packet to be communicated through the computer networking device;

inspecting the at least one data packet received to determine a type of data contained therein;

selectively varying levels of significance or weight accorded to each of the plurality of route attributes within a routing algorithm based on the type of data contained in the at least one data packet;

using the routing algorithm to choose an optimal route to one of the peer computer networking devices from among the plurality of routes based on the type of data contained in the data packet and the plurality of route attributes associated with each of said plurality of routes;

wherein said computer networking device and the peer computer networking devices comprise a second computer network which is an overlay upon on the first computer network, and wherein said plurality of routes traverse paths through said first computer network which include network nodes other than said peer networking devices.

2. The method according to claim 1, further comprising selecting said plurality of route attributes from the group consisting of the available bandwidth associate with the particular route, data latency associated with the particular route, data loss characteristics associated with the particular route and jitter corresponding to the route.

3. The method according to claim 1, wherein the type of data packet implies a type of application which communicated said data packet, and the routing algorithm selects the optimal route to facilitate optimal performance of the type of application which is implied.

4. The method according to claim 3, wherein said optimal performance is obtained by more heavily weighting within the routing algorithm the importance of one or more attributes from among the plurality of attributes for purposes of selecting the optimal route from among the plurality of routes.

5. The method according to claim 1, further comprising selectively varying an optimal route which is chosen for a subsequently received second data packet which is of the same type as the at least one data packet.

6. The method according to claim 5, wherein said optimal route is varied when a change occurs in one or more of the plurality of routes with respect to one or more of the route attributes which are predetermined to be of importance for communicating the type of data.

7. The method according to claim 1, wherein the obtaining step further comprises receiving from one or more of the peer computer networking devices one or more route update messages specifying the one or more network routes and plurality of route attributes.

8. The method according to claim 1, further comprising communicating to the plurality of peer computer networking devices one or more network routes to the peer computer network devices as identified by the computer networking device.

9. The method according to claim 8, further comprising including in said communication to the plurality of peer computer networking devices the plurality of route attributes associated with said one or more network routes.

10. The method according to claim 9, wherein the plurality of route attributes are dynamically variable and the first computer network device communicates updates to the peer computer network devices when a change exceeds a predetermined threshold.

11. The method according to claim 9, wherein updated information concerning the plurality of route attributes for each of said network routes is determined by the computer networking device based on data traffic communicated between the computer networking device and one or more of the peer computer network devices.

12. A network appliance for routing packet data through an overlay network, comprising:

a computer networking device including at least one processing circuit and configured to determine within a first computer network a plurality of routes to a plurality of peer computer networking devices;

obtain route information for each of the plurality of routes, said route information comprising a plurality of route attributes specifying dynamic characteristics for each of the plurality of routes;

store in a memory device the route information for each of the plurality of routes, including the plurality of route attributes;

receive at least one data packet to be communicated through the first computer network;

inspect the at least one data packet received to determine a type of data contained therein; and apply a routing algorithm to choose an optimal route to one of the peer computer networking devices from among the plurality of routes based on the type of data contained in the data packet and the plurality of route attributes associated with each of said plurality of routes;

wherein said computer networking device and the peer computer networking devices comprise a second computer network which is an overlay upon on the first computer network;

wherein said plurality of routes traverse paths through said first computer network which include network nodes other than said peer networking devices; and wherein said routing algorithm selectively varies a level of significance or weight accorded to each of the plurality of route attributes based on the type of data contained in the data packet.

13. The network appliance according to claim 12, wherein said plurality of route attributes are selected from the group consisting of the available bandwidth associate with the particular route, data latency associated with the particular route, data loss characteristics associated with the particular route and jitter corresponding to the route.

14. The network appliance according to claim 12, wherein the type of data packet implies a type of application which communicated said data packet, and the routing algorithm is configured to select the optimal route to facilitate optimal performance of the type of application which is implied.

15. The network appliance according to claim 14, wherein said optimal performance is obtained by selectively weighting within the routing algorithm the importance of one or more attributes from among the plurality of attributes for purposes of selecting the optimal route from among the plurality of routes.

16. The network appliance according to claim 12, wherein said routing algorithm selectively varies an optimal route which is chosen for a subsequently received second data packet which is of the same type as the at least one data packet.

17. The network appliance according to claim 16, wherein said routing algorithm is configured to vary the optimal route when a change occurs in one or more of the plurality of routes with respect to one or more of the route attributes which are predetermined to be of importance for communicating the type of data.

18. The network appliance according to claim 12, wherein the computer networking device is configured to receive from one or more of the peer computer networking devices one or more route update messages specifying the one or more network routes and plurality of route attributes.

19. The network appliance according to claim 12, wherein the computer networking device is configured to communicate to the plurality of peer computer networking devices one or more network routes to the peer computer network devices as identified by the computer networking device.

20. The network appliance according to claim 19, wherein the computer networking device is configured to include in said communication to the plurality of peer computer networking devices the plurality of route attributes associated with said one or more network routes.

21. The network appliance according to claim 20, wherein the plurality of route attributes are dynamically variable, and the first computer network device is configured to communicate updates to the peer computer network devices when a change exceeds a predetermined threshold.

22. The network appliance according to claim 20, wherein updated information concerning the plurality of route attributes for each of said network routes is determined by the computer networking device based on data traffic communicated between the computer networking device and one or more of the peer computer network devices.

* * * * *